United States Patent
Griffin et al.

(10) Patent No.: US 12,206,797 B2
(45) Date of Patent: Jan. 21, 2025

(54) SECURE LEDGER ASSURANCE TOKENIZATION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/201,267

(22) Filed: May 24, 2023

(65) Prior Publication Data

US 2023/0299976 A1    Sep. 21, 2023

Related U.S. Application Data

(63) Continuation of application No. 17/334,212, filed on May 28, 2021, now Pat. No. 11,784,824, which is a continuation of application No. 16/551,242, filed on Aug. 26, 2019, now Pat. No. 11,025,433, which is a continuation of application No. 15/498,335, filed on Apr. 26, 2017, now Pat. No. 10,404,471.

(51) Int. Cl.
| | |
|---|---|
| *H04L 29/06* | (2006.01) |
| *H04L 9/06* | (2006.01) |
| *H04L 9/32* | (2006.01) |

(52) U.S. Cl.
CPC .......... *H04L 9/3247* (2013.01); *H04L 9/0637* (2013.01); *H04L 9/0643* (2013.01); *H04L 2209/12* (2013.01)

(58) Field of Classification Search
CPC ... H04L 9/3247; H04L 9/0637; H04L 9/0643; H04L 2209/12; H04L 9/50; H04L 9/3239; H04L 9/3297; H04L 63/123; H04L 63/126
See application file for complete search history.

(56) References Cited

U.S. PATENT DOCUMENTS 7,289,971 B1 * 10/2007 O'Neil .................. G06Q 20/10
                                                              705/54
2003/0005327 A1    1/2003 Durand et al.
(Continued)

OTHER PUBLICATIONS

American National Standard for Financial Services, "Cryptographic Message Syntax ASN.1 and XML", ANSI X9.73-2010, Apr. 15, 2010. 89 pages.
(Continued)

*Primary Examiner* — Ka Shan Choy
(74) *Attorney, Agent, or Firm* — Foley & Lardner LP

(57) ABSTRACT

In a system, computer-readable media and methods for secure ledger assurance tokenization (SLAT), a block content of a first blockchain is audited, which includes accessing, by a request circuit of a SLAT computing system, a retrievably stored cross-reference content and generating an audit result. Generating an audit result includes evaluating, by a SLAT circuit of the SLAT computing system, the cross-reference content such that the audit result is informed at least by the cross-reference content. The audit result is included in a secure ledger assurance token generated by a SLAT generation circuit of the SLAT computing system and stored relationally to the block content of the first blockchain.

20 Claims, 14 Drawing Sheets

(56) References Cited

U.S. PATENT DOCUMENTS

| | | |
|---|---|---|
| 2014/0250215 A1 | 9/2014 | Bowen |
| 2014/0289192 A1 | 9/2014 | Michalscheck |
| 2016/0112456 A1 | 4/2016 | Pearson et al. |
| 2016/0203496 A1 | 7/2016 | Guerrero et al. |
| 2017/0006533 A1 | 1/2017 | Gould et al. |
| 2017/0063533 A1* | 3/2017 | Barham .............. H04L 9/0643 |
| 2017/0104731 A1* | 4/2017 | Baudoin .............. H04L 63/123 |
| 2017/0163733 A1* | 6/2017 | Grefen ................ H04L 9/3236 |
| 2017/0214675 A1 | 7/2017 | Johnsrud et al. |
| 2018/0150835 A1* | 5/2018 | Hunt .................. G06Q 20/3827 |
| 2018/0152289 A1 | 5/2018 | Hunt et al. |
| 2018/0165476 A1* | 6/2018 | Carey ................. H04L 9/3247 |
| 2018/0189312 A1* | 7/2018 | Alas .................... H04L 9/3239 |
| 2019/0253260 A1* | 8/2019 | Uehara ................ G09C 1/00 |
| 2019/0288850 A1* | 9/2019 | Beecham ............ G06F 21/6209 |

OTHER PUBLICATIONS

American National Standard for Financial Services, Retail Financial Services-Requirements for Protection of Sensitive Payment Card Data—Part 2: Implementing Post-Authorization Tokenization Systems, ANSI x9.119-2016. 67 pages.
American National Standard for Financial Services, Biometric Information Management and Security for the Financial Services Industry, ANSI X9.84-2010. 172 pages.
American National Standard for Financial Services, Trusted Time Stamp Management and Security, ANSI X9.95-2011. 150 pages.
Itu-T, X.1035, Series X: Data Networks, Open System Communication and Security Telecommunication security, Password-authenticated key exchange (PAK) protocol, Feb. 2007. 12 pages.
Itu-T, X.660, Information Technology - Procedures for the operation of object identifier registration authorities: General procedures and top arcs of the international object identifier tree, Jul. 2011. 32 pages.
Itu-T, X509, Information technology - Open Systems Interconnection - The Directory: Public-key and attribute certificate frameworks, Oct. 2012. 208 pages.
Lewis, Anthony, "Data Retention, Immutability, and DLT: How Long is Forever?", r3. Decrypting Crypto, Mar. 27, 2107. 3 Pages.
Rutland, Emily; "What is Triple Entry Accounting?", R3 Blockchain Byte, 2016. 3 pages.
Treat, David, "Accenture: Absolute Immutability Will Slow Blockchain Progress", http://www.coindesk.com/absoluteimmutabilitywillslowpermissionedblockchainprogress/, Sep. 20, 2016. 3 pages.

* cited by examiner

SECURE LEDGER ASSURANCE TOKENIZATION

PRIORITY CLAIM

The present application is a continuation of U.S. patent application Ser. No. 17/334,212 entitled "SECURE LEDGER ASSURANCE TOKENIZATION" filed May 28, 2021, which is a continuation of U.S. patent application Ser. No. 16/551,242 entitled "SECURE LEDGER ASSURANCE TOKENIZATION" filed Aug. 26, 2019, now U.S. Pat. No. 11,025,433, which is a continuation of U.S. patent application Ser. No. 15/498,335 entitled "SECURE LEDGER ASSURANCE TOKENIZATION" filed Apr. 26, 2017, now U.S. Pat. No. 10,404,471, all of which are incorporated herein by reference in their entireties.

BACKGROUND

A blockchain is a publicly viewable, append-only, distributed ledger. A conventional blockchain includes multiple blocks, each containing data and a hash of the previous block, thereby linking the blocks in the blockchain. Blockchain entries consist of blocks of information that can include financial and other types of transactions, data records, and other information, such as timestamps. An example of a trusted timestamp is a timestamp that incorporates a time stamp token (TST). As an example, trusted timestamps can be defined according to the X.509 Public Key Infrastructure Time-Stamp Protocol (RFC 3161) specification.

Blockchains can be permissionless or permissioned. A permissionless blockchain is one in which identity of participants is anonymous or pseudonymous. Transactions are processed through a proof-of-work consensus mechanism in which participants agree that the fork with the lengthiest proof of work behind it at a given time is deemed the correct fork.

A permissioned blockchain is one in which participant identities must be authorized to contribute to validating transactions. Permissioned blockchains can utilize various consensus mechanisms, such as proof-of-stake. Because participants in a permissioned blockchain are known and vetted, the consensus mechanism of permissioned blockchains can be much less computationally-intensive than that of permissionless blockchains.

SUMMARY

Various embodiments relate to a method performed by a processor of a system for secure ledger assurance tokenization. In an example embodiment, a request circuit is structured to access a first block of a first blockchain. The first block includes a first block identifier of the first blockchain and first block content. The request circuit is structured to audit the first block content so as to generate a first audit result. A secure ledger assurance token (SLAT) generation circuit is structured to generate a first SLAT. The first SLAT includes the first block identifier of the first blockchain and the first audit result. The cryptographic circuit is structured to cryptographically protect the first SLAT by, for example, digitally signing it. The SLAT generation circuit stores the cryptographically protected first SLAT in an event journal. The cryptographically protected first SLAT is accessible by an authorized stakeholder to provide integrity and origin authenticity of the first audit result. In some embodiments, an audit anchor is associated with a SLAT and the content of the first blockchain is pruned up to the point defined by the audit anchor.

Another example embodiment relates to a SLAT computing system. The SLAT system includes a request circuit, a SLAT generation circuit, and a cryptographic circuit. The request circuit is structured to access a first block of a first blockchain. The first block includes a first block identifier of the first blockchain and first block content. The request circuit is structured to audit the first block content so as to generate a first audit result. A secure ledger assurance token (SLAT) generation circuit is structured to generate a first SLAT. The first SLAT includes the first block identifier of the first blockchain and the first audit result. The cryptographic circuit is structured to cryptographically protect the first SLAT. The SLAT generation circuit stores the cryptographically protected first SLAT in an event journal. The cryptographically protected first SLAT is accessible by an authorized stakeholder to provide integrity and origin authenticity of the first audit result. In some embodiments, an audit anchor is associated with a SLAT and the content of the first blockchain is pruned up to the point defined by the audit anchor.

These and other features, together with the organization and manner of operation thereof, will become apparent from the following detailed description when taken in conjunction with the accompanying drawings, wherein like elements have like numerals throughout the several drawings described below.

Figure 1:
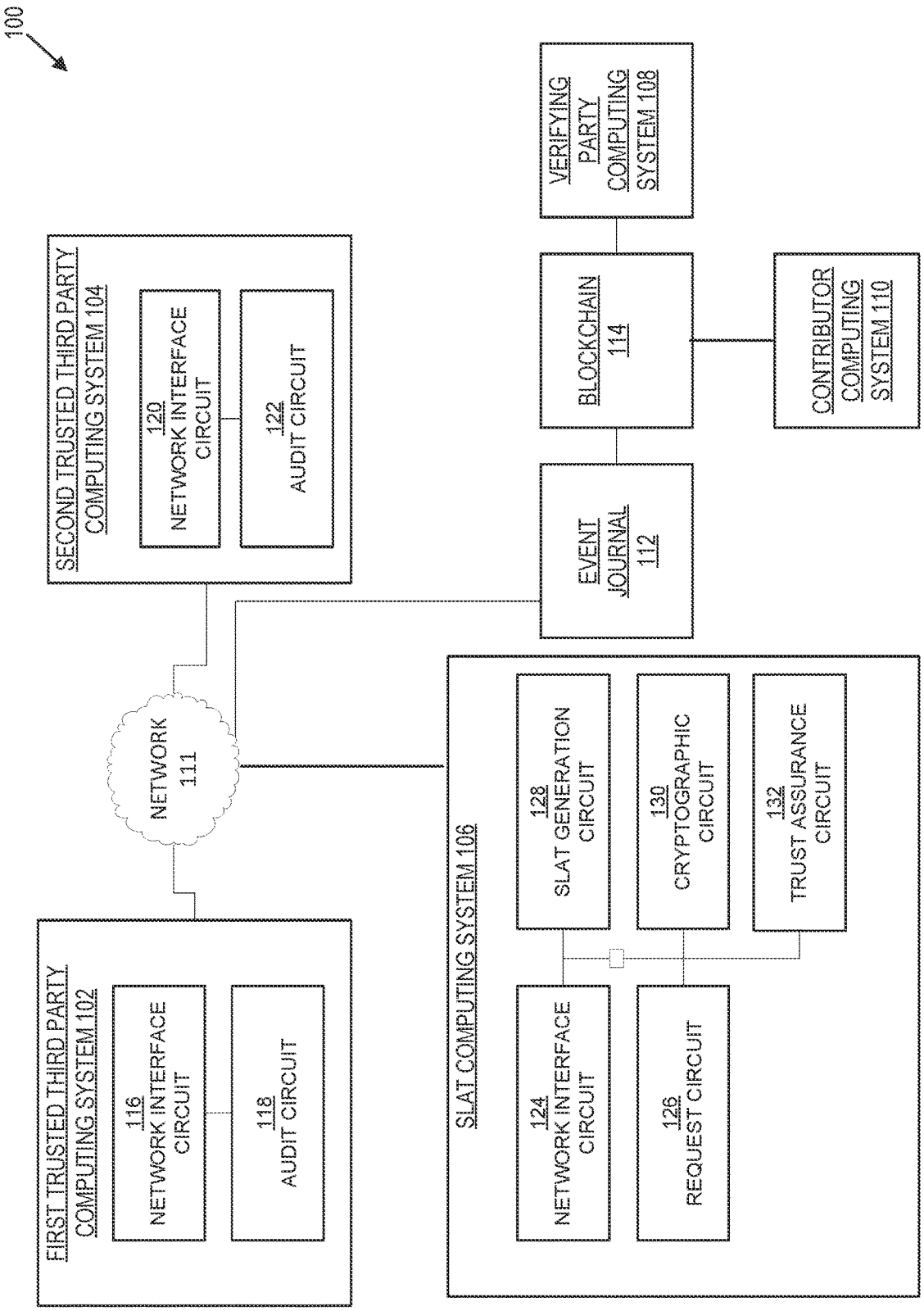
FIG. 1 is a component diagram of a system for secure ledger assurance tokenization, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Data stored in permissionless blockchains is generally considered to be immutable due to the computationally-intensive proof-of-work consensus mechanism. However, the data can be compromised if a critical amount of consensus resources (computing power) agrees to alter the data. This is unlikely, but not computationally infeasible. Immutability of permissioned ledgers depends on trust between participants. Thus, data in permissioned ledgers may be compromised if trust between enough participants erodes. Accordingly, it may be beneficial to be able to independently audit content in both permissionless and permissioned blockchains at particular points in time.

Referring to the figures generally, various embodiments relate to systems and methods for secure ledger assurance tokenization. Various embodiments define the message schema and the associated creation and verification processing of a secure ledger assurance token (SLAT).

A SLAT is a cryptographically protected information object that provides publicly available evidence that an assessment or audit activity has been performed on distributed ledger (e.g., log file, blockchain, etc.), and results that were obtained from the activity. In some embodiments, the audit activity comprises a description of the outcome of the audit, such as whether the block passed or failed the audit. In some embodiments, the SLAT is cryptographically protected using a digital signature. In other embodiments, the SLAT is cryptographically protected using a trusted timestamp. In yet other embodiments, the SLAT is cryptographically protected using encryption. A SLAT can be added to a distributed ledger to provide transparent assurance of the integrity of the journal, its origin authenticity, the validity of its contents, and the confidentiality of any elements that one or more verifying and/or relying parties consider sensitive. As will be appreciated, methods are provided for generating a SLAT, generating an audit anchor, pruning the block content defined by the audit anchor, verifying blockchain content defined by multiple SLAT records and audit anchors, managing a trust verification activity, trust assurance auditing comprising SLAT, and managing the trust assurance auditing process.

The SLAT schema facilitates multilateral agreement by stakeholders on the validity of a distributed ledger. The stakeholders, in some embodiments, are accounting entities auditing, for example, an operating entity. Individually, the stakeholders may audit operating entities in accordance with the rules and practices agreed upon in the industry, such as the Generally Acceptable Accounting Practices (GAAP), and some embodiments of the SLAT schema may extend the GAAP principles (or a similar set of rules) to multilateral audits. In some embodiments, the SLAT schema relies on a trusted third party (e.g., an accounting firm, a technology security assessor, or an internal auditor) to place a cryptographically protected SLAT object in a journal, which in some embodiments is an event journal accessible by multiple stakeholders in a collaborative audit environment. Advantageously, no proof-of-work is required to operate a SLAT schema. Furthermore, SLAT does not require that relying parties each spend resources to verify the validity of a blockchain or another similar structure in order to establish a consensus agreement that the structure, or a segment thereof, has integrity and authenticity.

The SLAT schema can be used in establishing assurance in the validity of any kind of blockchain data, including distributed ledgers that reside in a public cloud or in a blockchain environment. In a blockchain implementation, SLAT can be used to establish one or more audit anchors, which, in some embodiments, can be conceptualized as audit stamps so that the validity of the blockchain structure content preceding a given SLAT object or between two SLAT objects can be trusted by the relying parties. In some embodiments, audit anchors are periodic such that only a segment of the blockchain is audited at a time. Audit anchors eliminate the need to repeatedly traverse an entire blockchain to verify its structural integrity.

A SLAT object can be inserted into an element within a transaction in a block to attest to the validity of distributed ledger content. For example, in certain embodiments, a specific smart contract in a blockchain may be audited and a SLAT object added to a blockchain transaction or element that contains a pointer to the contract along with a time- and date-stamped indication that the contract has been reviewed.

FIG. 1 is a component diagram of a SLAT system 100, according to an example embodiment. The SLAT system 100 replaces the conventional consensus agreement in a blockchain where the validity of a blockchain at some point in time is confirmed by proof-of-work—for instance, creating a bitcoin or other mechanisms that require a group of relying parties to come to agreement only after resource-intensive processing is performed to verify the entire chain of transactions on the blockchain. The SLAT system 100 replaces the consensus mechanism with an audit anchor that is associated with the blockchain and allows a trusted third party to attest to the validity of the blockchain structure or its content at a particular point in time. Further, if the blockchain is trusted by the relying parties, the SLAT system 100 allows old data, as denoted by the audit anchor, to be pruned from the blockchain to improve computational efficiency.

As shown in FIG. 1, in an example embodiment, the SLAT system 100 comprises a first trusted third-party computing system 102, a second trusted third-party computing system 104, a SLAT computing system 106, a verifying party computing system 108, a contributor computing system 110, an event journal 112, and a blockchain 114. These components are in operative communication with each other via the network 111. The network 111 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

One or more users of the blockchain 114 may contribute content thereto. For example, in a math-based currency environment, the users may engage in payment transactions using math-based currencies, and each transaction may be recorded in a block on the blockchain 114. The users may contribute content (e.g., transactions) via one or more contributor computing systems 110, each contributor computing system 110 being associated with a user-contributor. The operator of the blockchain 114 or a consortium of operators (for example, a consortium of banks) may engage one or more auditors to audit the content of the blockchain 114 and verify its integrity. For example, a first auditor may be an accounting firm and may be associated with the first trusted third-party computing system 102. A second auditor may be another accounting firm or a regulatory agency and may be associated with the second trusted third-party computing system 104. The first auditor may verify the content of the blockchain 114 up to a certain block (representing a point in time) and may use the SLAT computing system 106 to generate a SLAT, confirming the integrity of the first audited segment. The SLAT may be recorded in the event journal 112. The event journal 112 is accessible to the users of the contributor computing system 110 and the verifying party computing system 108. Additionally, the event journal is accessible to trusted third-party computing systems, such as the first trusted third-party computing system 102 and the second trusted third-party computing system 104.

In some embodiments, the event journal 112 may reside on the blockchain 114. In other words, one or more SLATs may be stored on the blockchain 114. Further, the second auditor may audit the same or a different subset of blocks on the blockchain and create a second SLAT in the event journal 112. For example, a periodic automatic audit of the blockchain 114 may be scheduled to be run by a third-party service provider and automatically saved, as a successive series of SLAT tokens, in the event journal 112. Users of the verifying party computing system 108 may access the event journal 112 to view the results of the audit(s). Some items comprising confidential data associated with the audit may be hidden from the public—for example, to meet regulatory requirements.

According to various embodiments, the SLAT computing system 106 comprises a network interface circuit 124, a request circuit 126, a SLAT generation circuit 128, and cryptographic circuit 130, and a trust assurance circuit 132.

The network interface circuit 124 is structured to facilitate operative communication between the SLAT computing system 106 and any of the auxiliary systems, such as those shown in FIG. 1.

The request circuit 126 is structured to send and receive the content of the audited ledger or log file for further processing by the SLAT computing system 106. In some embodiments, the audited ledger is the blockchain 114, and the request circuit is structured to send and receive the content and identifiers (e.g., hash codes) for various blocks.

The SLAT generation circuit 128 is structured to generate and manage SLATs, audit anchors, and audit results—for example, as described in FIGS. 2-9.

The cryptographic circuit 130 is structured to generate digital signatures associated with the SLAT records. For example, an auditing party may cryptographically protected a SLAT record as described further herein. In some embodiments, the identity of a SLAT object signer is authenticated using a Public Key Infrastructure (PKI). Thus, the SLAT object provides trust in the validity and integrity of a distributed ledger to be based on an attestation of a trusted third party rather than consensus agreement based on trust or belief in cryptographic operations.

Figure 4:
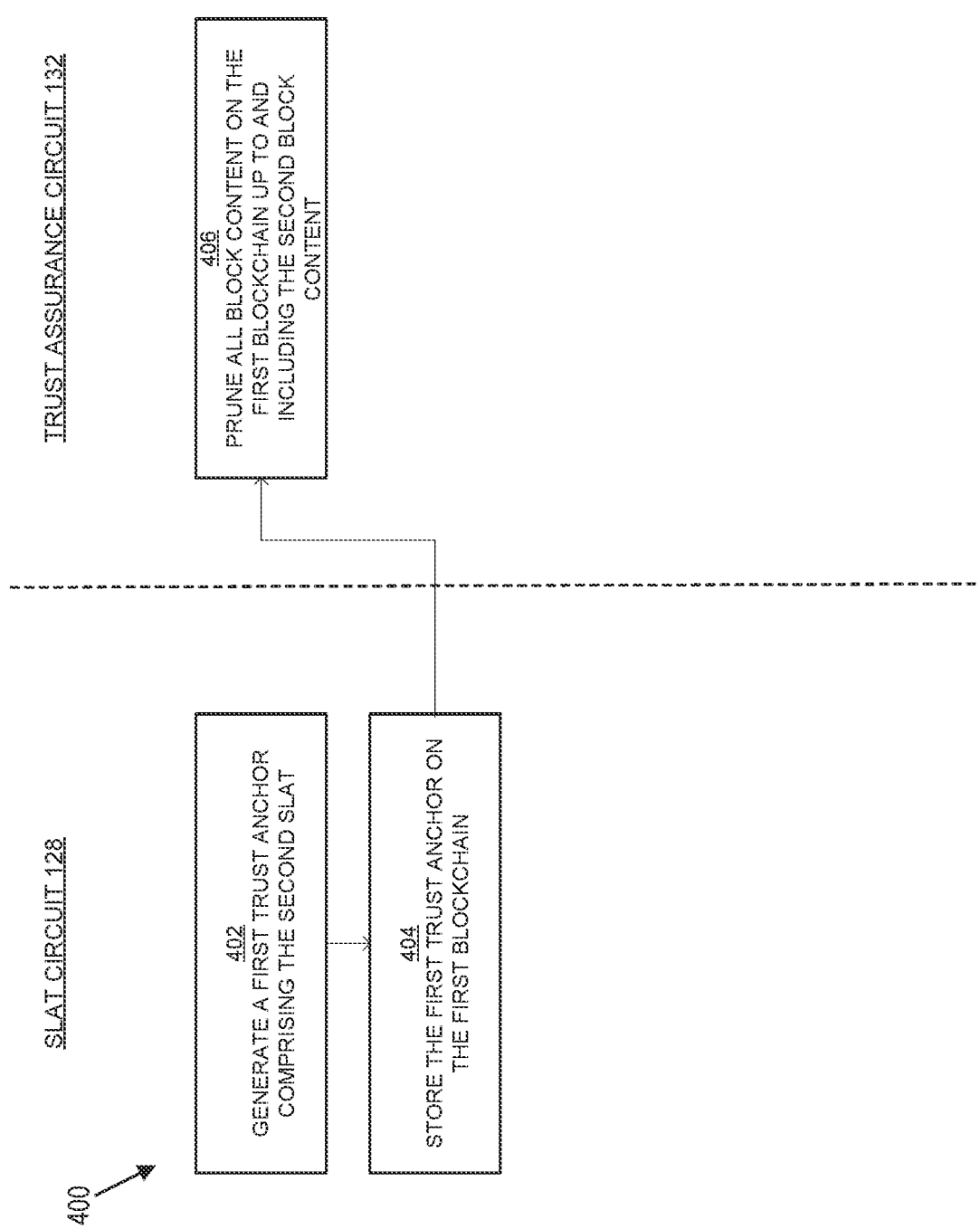
FIG. 4 is a schematic flow diagram of a method of generating an audit anchor and pruning blockchain content up to a point defined by the audit anchor, according to an example embodiment.
Figure 5:
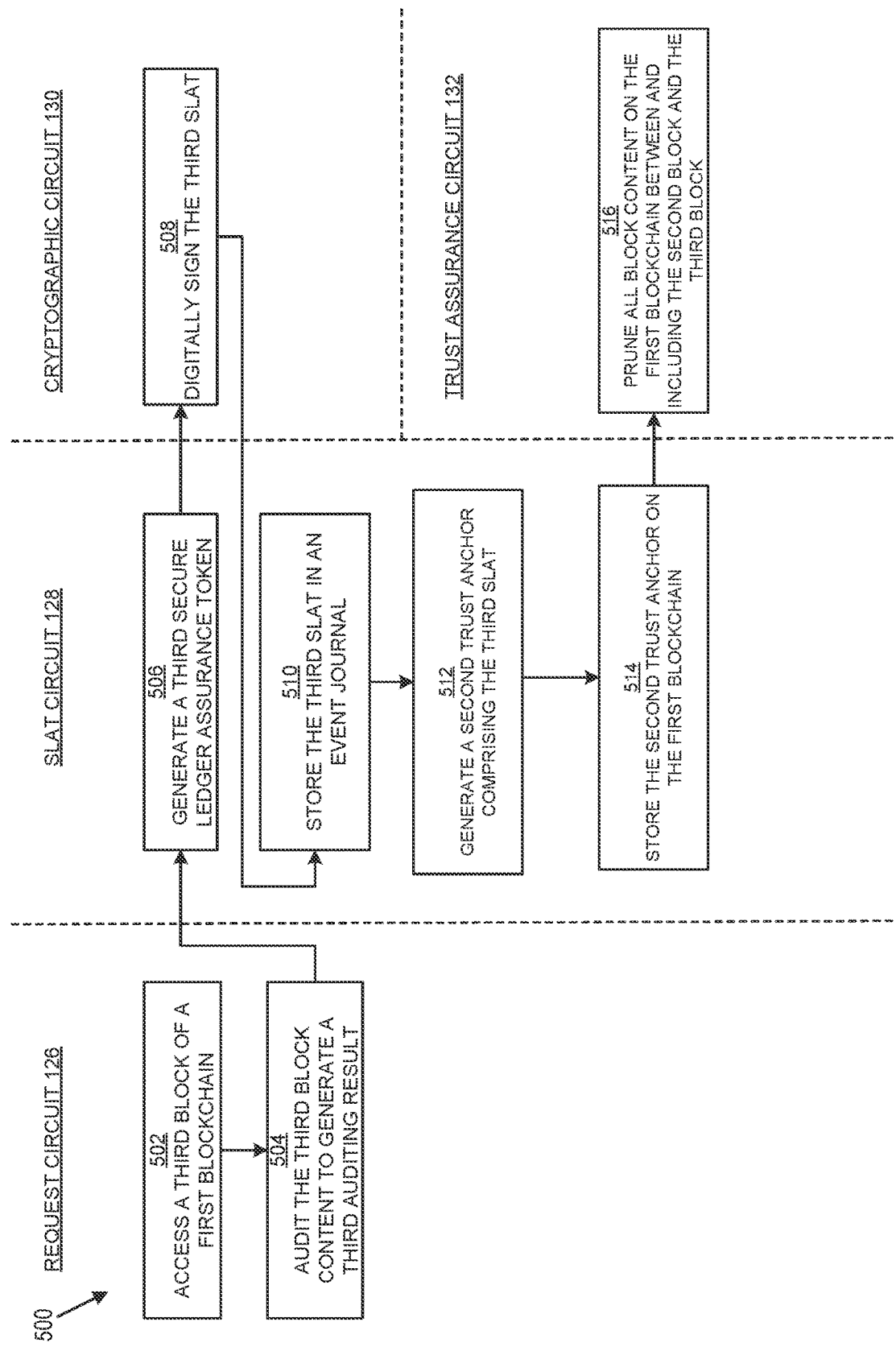
FIG. 5 is a schematic flow diagram of a method of verifying blockchain content defined by multiple SLAT records and audit anchors, according to an example embodiment.

The trust assurance circuit 132 is structured to prune and archive block content as described, for example, in reference to FIGS. 4-5. In some transactions, blockchain data may have limited useful life and only be of value to business organizations for a certain period of time. For instance, the blockchain 114 may be used to manage yearly reward points or vacation time, and the value of the reward and/or vacation "banks" may be reset to zero at the start of a new period. Here, instead of auditing the entire history of transactions on the blockchain 114, a SLAT, associated with an audit anchor, may be generated following an audit by a trusted third party. The SLAT may be associated with a block that marks the start of the new period. The blocks containing transactions from prior periods may be archived, and/or the block corresponding to the new period may be marked as a new "root block" on the blockchain such that subsequent audits by trusted third parties do not have to (but may) look at the historical data. Thus, in contrast or in addition to a proof-of-work mechanism, the content of the blockchain 114 may be incrementally verified.

Figure 2:
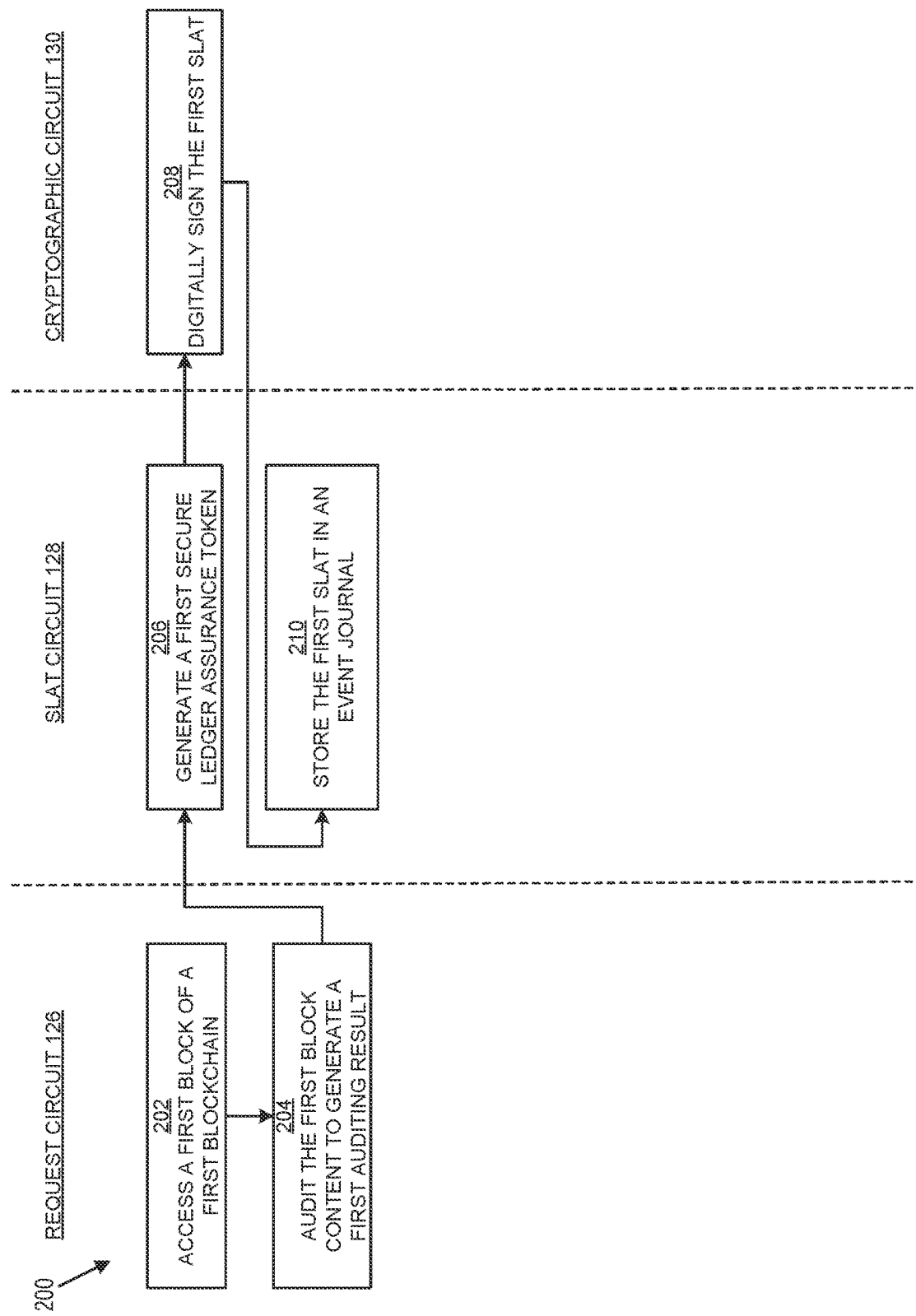
FIG. 2 is a schematic flow diagram of a method of generating a SLAT, according to an example embodiment.

FIG. 2 is a schematic flow diagram of a method 200 of generating a SLAT, according to an example embodiment. In some embodiments, the SLAT information object is cryptographically protected by a digital signature, for example, via the Cryptographic Message Syntax (CMS) type Signed-Data. A version of the SignedData message type is specified in a revision of the X9.73 CMS financial services security standard and ITU-T Recommendation X.894 CMS. In some implementations, the Cryptographic Message Syntax (CMS) type SigncryptedData is used.

The digital signature cryptographic operation provides a data integrity mechanism that protects the signed content during transfer and storage within, for example, a CMS SignedData message. An origin authenticity mechanism is also provided. The origin authenticity mechanism relies on a digital signature associated with the public key certificate of the signing individual. In some embodiments, multiple signers and countersignatures are supported.

At 202, the request circuit 126 accesses a first block. The first block is part of a first blockchain, such as the blockchain 114 shown in FIG. 1. In some embodiments, the first block includes a first block identifier of the first blockchain that uniquely identifies the first block and may be stored as a block hash. In some embodiments, the first block identifier of the first blockchain is a pointer to a block of a blockchain. In such embodiments, the SLAT record is used to navigate to the audited block in the blockchain. In some embodiments, the first block identifier of the first blockchain is a URL that identifies a block on an auxiliary or distributed system. In some embodiments, such as relational database implementations of the SLAT schema, the first block identifier of the first blockchain is a field in a record that identifies a block. The first block also includes first block content. As discussed further herein, the content item is extendable.

At 204, the request circuit 126 audits the first block content of the first blockchain. The first block content of the first blockchain is used to generate the first audit result. The first audit result is generated, for example as described further herein with reference to FIGS. 8 and 9. In general, auditing block content comprises determining that the block content is free of material error. For example, auditing may involve validating block content against external data. The first audit result may be generated by an auditor associated with the first trusted third-party computing system 102. An audit result may include, for example, an indicator (e.g., a binary indicator) of whether or not the block content is valid. An audit result may, additionally or alternatively, include other information, such as audit options, assumptions, confidence intervals, etc. An auditor, in this context, refers to an entity conducting an assessment of data validity and integrity on the blockchain, such as, for example, an accounting/financial transaction audit, a PKI assessment, a security assessment, and/or a block time stamp assessment. The auditor and the first and second trusted computing system(s) 102-104 may be internal (associated with the owner of the blockchain 114) or external to the entity or entities that operate the blockchain 114.

At 206, the SLAT generation circuit 128 generates a first SLAT. The first SLAT comprises at least the first block identifier of the first blockchain accessed at 202. The first SLAT also comprises the first audit result.

In an example embodiment, the structure and format of a SLAT is specified using a suitable programming language. It should be understood that it is not the intent of the present disclosure to limit example implementations to specific programming languages and/or computing environments. In some implementations, the programming language may be a high-level language providing a level of abstraction from the computing environment's instruction set architecture. In certain implementations, the programming language may be a suitable machine language or assembly language.

An example implementation of SLAT, shown below, uses the Abstract Syntax Notation One (ASN.1) schema definition notation standardized by ISO, IEC, and ITU-T.

```
SLAT ::= SEQUENCE {version Version DEFAULT v0,
//example: Version ::= INTEGER { v0(0) } ( v0, ... )
activity Activity,
result    Result,
level     Level,
other     OtherAspects
}
```

Attributes of any kind or format can be included in the first SLAT. For instance, in some embodiments, an attribute can be included that indicates the purpose of the digital signature (e.g., regulatory compliance, contractual requirement, internal audit, etc.).

Figure 8:
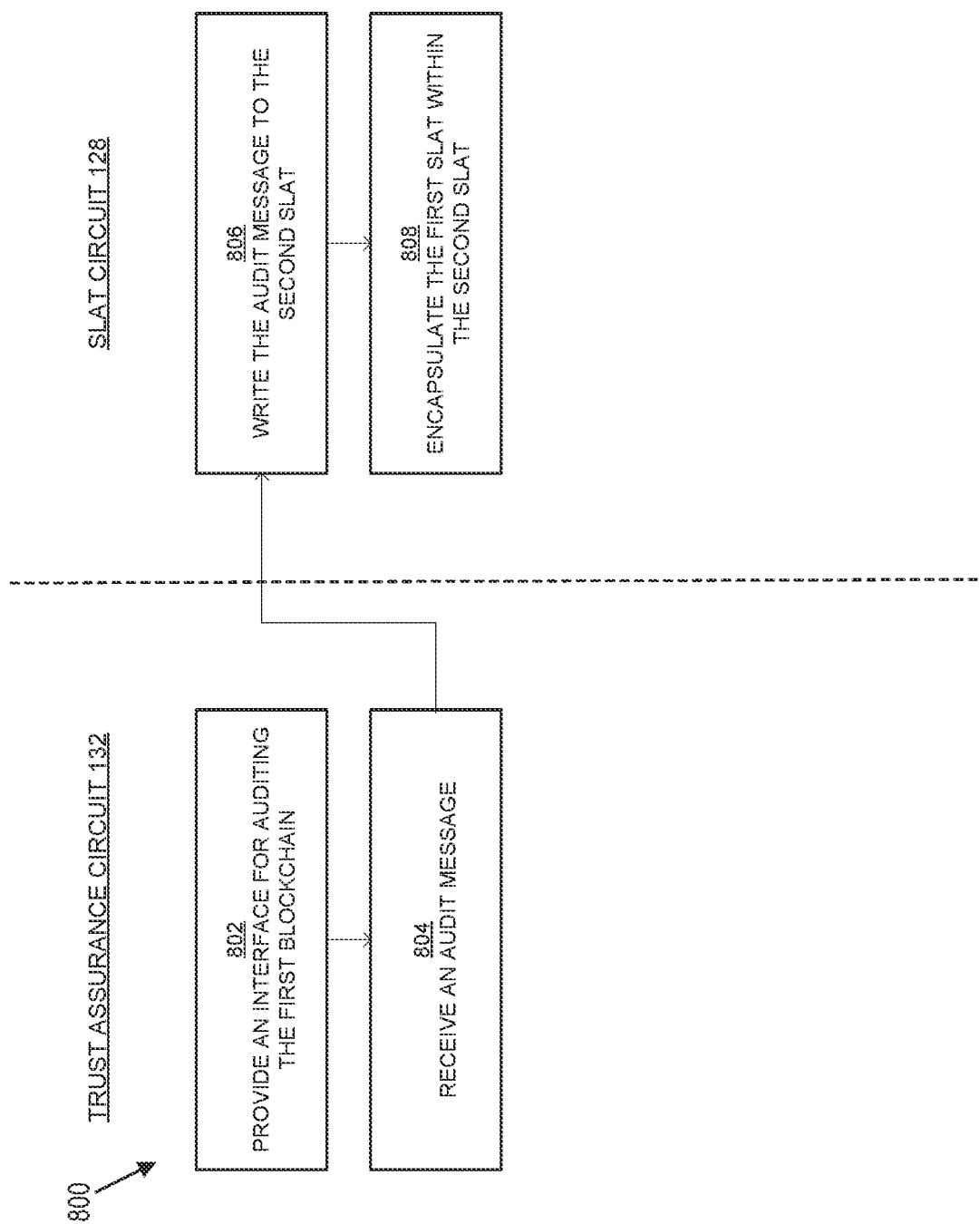
FIG. 8 is a schematic flow diagram of a method of trust assurance auditing using SLAT, according to an example embodiment.
Figure 9:
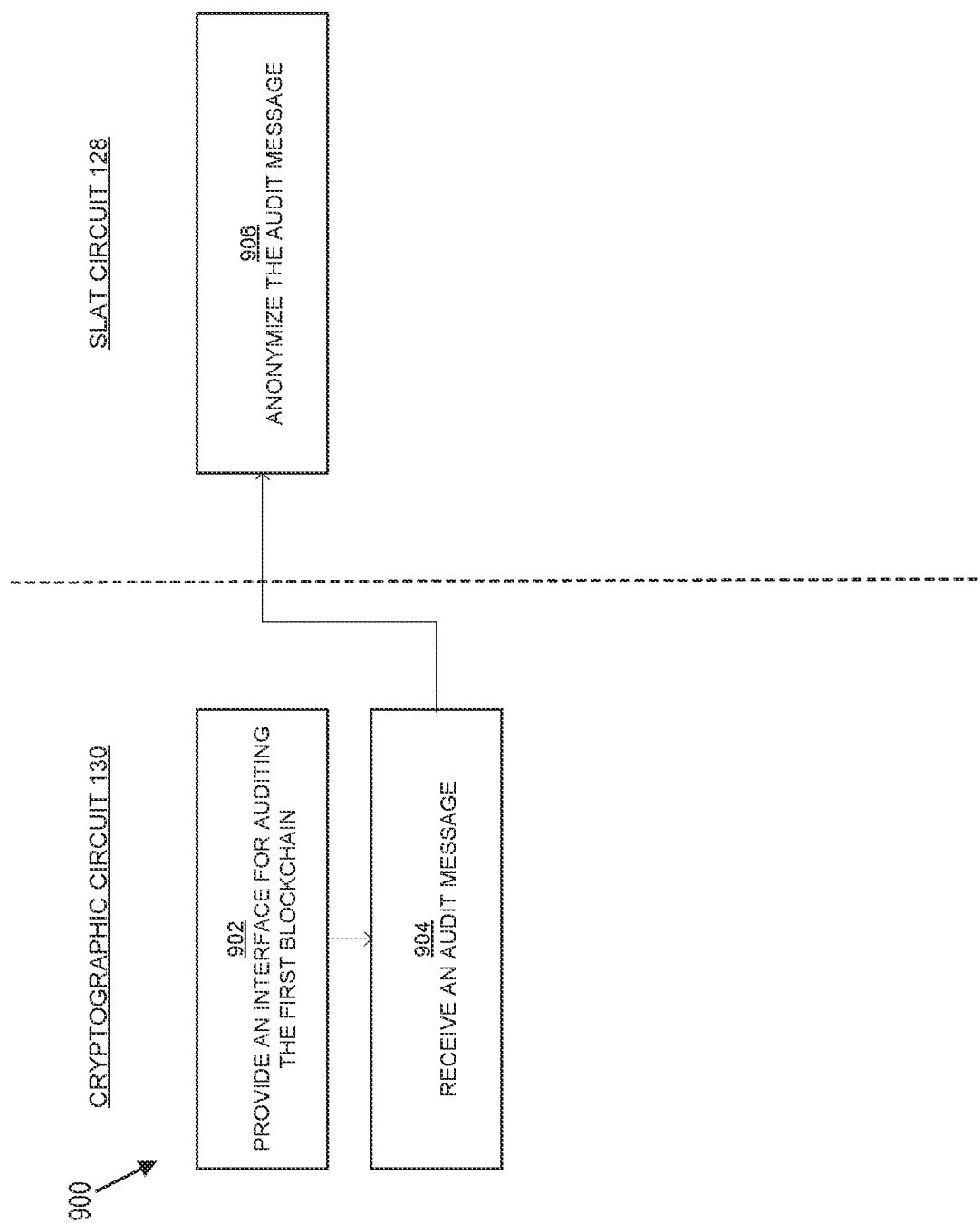
FIG. 9 is a schematic flow diagram of a method of anonymizing an audit report, according to an example embodiment.

Furthermore, as described further herein in reference to FIGS. 8-9, the audit result can also be included in the message as an attribute and cryptographically bound to a SLAT using a digital signature. In some embodiments, the audit result that is associated with an audit activity is conceptualized as follows:

```
Activity ::= SEQUENCE {name ACTIVITY.&name({ActivitySet}),
type ACTIVITY.&Type({ActivitySet}{@name}) OPTIONAL
}
ActivitySet ACTIVITY ::= { ... -- Defined as needed -- }
ACTIVITY ::= CLASS {
&name OBJECT IDENTIFIER UNIQUE,
&Type OPTIONAL
}
```

In some embodiments, the audit activity comprises a description of the outcome of the audit, such as whether the block passed or failed the audit. In some embodiments, an indicator is included in the SLAT that the audit of an identified block failed. In certain embodiments where a range of audited blocks is defined by audit anchor(s), the indicator that the audit failed applies to these multiple blocks.

In some embodiments, a set of URL(s) is included, pointing to the block(s) that caused the negative findings and including a description of each block's issue.

In some embodiments, as described further herein, the audit result is denoted by a signed pointer in the SLAT. The pointer links to a separate data structure that contains the actual audit result, ensuring confidentiality. For example, confidentiality of the audit results can be protected by access controls that control availability to the information on a need-to-know basis. In the example implementation of the SLAT schema, the type Result can be conceptualized as follows:

```
Result ::= CHOICE {
plain-text UTF8String,
ciphertext NamedKeyEncryptedData
}
```

Conceptually, the type Result is a structure that defines how audit results are to be securely accessed by consumers of the audit results, such as the users of the verifying party computing system 108. In an example implementation, the type Result is defined as a choice type having two choice options: a plain text value that supports content formed from any national language and a cipher text value. The cipher text value may be implemented as the CMS message type NamedKeyEncryptedData. In an example embodiment, a corresponding cryptographic message is defined in the X9.73 CMS-ASN.1 and XML standard as follows:

```
NamedKeyEncryptedData ::= SEQUENCE {
version CMSVersion,
keyName [0] OCTET STRING OPTIONAL,
encryptedContentInfo EncryptedContentInfo,
unprotectedAttrs   [1] UnprotectedAttributes OPTIONAL
}
```

In the example implementation shown above, the key-Name component of the type Result is defined as a value of ASN.1 type OCTET STRING. Conventionally, an example value of type OCTET STRING is an opaque string that can contain any type or format of data. In some embodiments of the Result component of the type SLAT, the opaque string is set to a Uniform Resource Identifier (URI) query string that identifies the name and the location of the symmetric key needed to decrypt the cipher text that is stored in the encryptedContentInfo component of the type Result, thus helping recover the plain text audit results.

In an example embodiment, the value of the keyName component of the type Result contains an embedded value type URI that may be encoded using the ASN.1 XML Encoding Rules (XER) before being used to form the URI query string. Advantageously, in the example embodiment, no further processing is required other than the URL-encoding (also known as percent encoding) for the ampersand and equals character delimiters in the query string.

Type URI is defined as a value of ASN.1 type UTF8String, which can contain characters from a national language and can be used to include an audit summary directly within a SLAT object. A URI is in the form of a Uniform Resource Locator (URL), and both can be used to identify and locate a resource on the internet. The URI in the value of type Result can be used with both the Hypertext Transfer Protocol (http) and http over Secure Socket Layer (https) URL schemas defined in IETF RFC 2396. The general syntax of the query string is ?key, where the value of the key identifies a symmetric key, and this value serves as the parameter "<key>" of the URI query string.

In some embodiments, one or more URL pointers to various blocks provide globally unique identifiers that disambiguate which blockchain a particular block identifier is associated with. Thus, the URL pointers abrogate identification issues if two different blockchains identify their respective blocks using the same schema. In some embodiments, a URL pointer to a specific block in a specific blockchain is included in the SLAT and it is possible to create a database or blockchain of SLAT records that contain audits of blocks from more than one target blockchain. Thus, it is possible to audit multi-party transactions where data comes from different blockchains and provide an overview of the entire transaction even through the transaction flows are recorded in a distributed manner.

Returning now to the example implementation of SLAT, the type Level indicates the scope of the audit or assessment activity and can be conceptualized as follows:

Level::=ENUMERATED {full(0), delta(1)}

In an example embodiment, the value of the Level component of type SLAT is defined as a value of ASN.1 type ENUMERATED. In an example use case, when the target of the activity is an entire distributed ledger, this value of the parameter full is set to 1. In the alternative, when the activity covers journal events following the most recent activity (e.g., events summarized in a prior SLAT object), the value of the parameter delta is set to 1.

Referring again to the method 200 of FIG. 2, at 208, the first SLAT is digitally signed by the cryptographic circuit 130. In some embodiments, the first SLAT is stored as a SignedData message type such that a value of type SLAT is the content signed is an instance of the CMS type SignedData. The signature cryptographically binds the content to the attributes. In some embodiments, the first SLAT is cryptographically protected using a trusted timestamp. In some embodiments, the first SLAT is cryptographically protected using encryption.

According to various embodiments, there may be any number of SignedData cosigners or countersignatures. In some embodiments, when an audit activity has been performed on behalf of a set of blockchain participants, consensus agreement with the audit or assessment results may be indicated by the signatures of these participants. Such indications of agreement can be used as an alternative to the computation-expensive methods of obtaining a consensus agreement used in in the blockchain schemas that underlie various math-based currency protocols.

At 210, the SLAT generation circuit 128 stores the first SLAT in a data store. In some implementations, the data store is an event journal 112.

Figure 3:
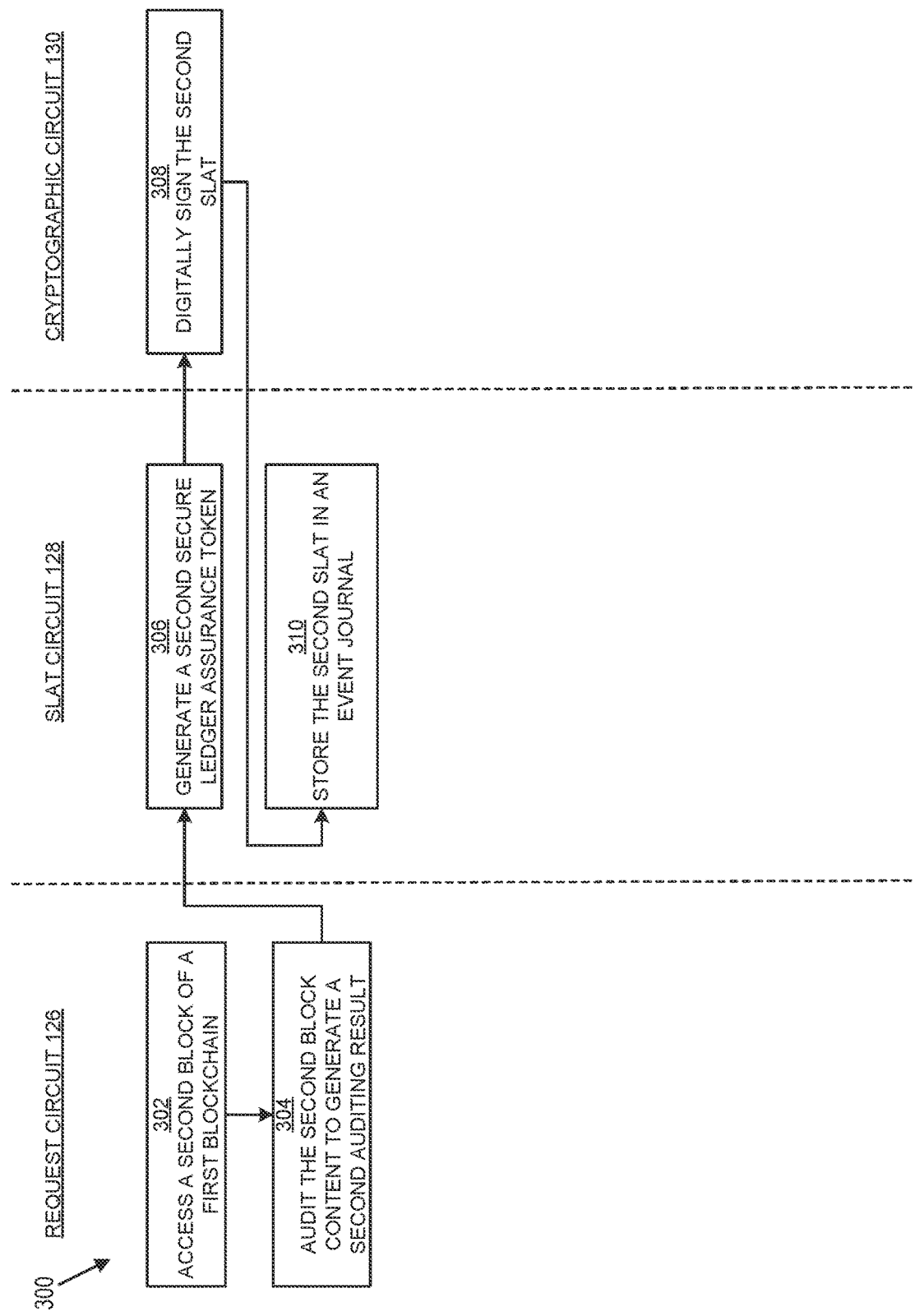
FIG. 3 is a schematic flow diagram of a method of generating a second SLAT, according to an example embodiment.

FIG. 3 is a schematic flow diagram of a method 300 of generating a second SLAT, according to an example embodiment. In some embodiments, the purpose of the second SLAT is to audit different blockchain content than that audited in connection with the first SLAT. In some embodiments, the second SLAT is generated by an entity different from the entity that generated the first SLAT. For example, a business entity may retain the first auditor to audit the company's records for a certain fiscal year (and create a first SLAT representative of the audit results) and then retain a second auditor that may audit the company's records in a subsequent year. The first auditor may be associated with the first trusted third-party computing system 102. The second auditor may be associated with the second trusted third-party computing system 104. The second auditor may create a second SLAT, which may be used to manage an audit anchor and, in some embodiments, to define a pruning point, as discussed further in reference to FIGS. 4-5.

The second SLAT may be generated according to the method 200 shown in FIG. 2. In some embodiments, to generate the second SLAT, at 302, the request circuit 126 accesses a second block. The second block is part of a first blockchain, such as blockchain 114 shown in FIG. 1. The second block may include a second block identifier that uniquely identifies the second block and may be stored as a block hash. At 304, the request circuit 126 receives the second block content of the first blockchain. The second block content of the first blockchain is used to generate a second audit result. The second audit result is generated, for example, as described further herein with reference to FIGS. 8 and 9. At 306, the SLAT generation circuit 128 generates a second SLAT.

In some embodiments, the second SLAT is stored as a SignedData message type. The second SLAT comprises at least the second block identifier of the second blockchain accessed at 302. The second SLAT also comprises at least the second audit result. The second block may include second block content, which may be stored as the content item of a SignedData message of the second SLAT. At 308, the cryptographic circuit 130 digitally signs the second SLAT. In some embodiments, the second SLAT is cryptographically protected using a trusted timestamp. In some embodiments, the second SLAT is cryptographically protected using encryption. At 310, the SLAT generation circuit 128 stores the second SLAT in a data store. In some implementations, the data store is an event journal (e.g., the event journal 112).

FIG. 4 is a schematic flow diagram of a method 400 of generating an audit anchor and pruning blockchain content up to a point defined by the audit anchor, according to an example embodiment. An audit anchor may be conceptualized as an audit stamp. The purpose of the audit anchor is to verify the validity of the blockchain structure content preceding a given SLAT object or between two SLAT objects. Audit anchors eliminate the need in to repeatedly traverse an entire blockchain to verify its integrity.

At 402, the SLAT generation circuit 128 generates a first audit anchor. In some implementations, the first audit anchor is implemented as a separate SignedData message or as part of a SignedData message of a SLAT. In some embodiments, parameters defining an audit anchor are included as attributes of the SignedData message. For example, audit anchor parameters may define the particular blocks and/or block content encompassed by the audit anchor.

At 404, the SLAT generation circuit 128 stores the first audit anchor on the first blockchain. In an example embodiment, the first audit anchor is associated with the second block through the second SLAT. The first audit anchor defines the pruning point associated with the second audit result.

At 406, the trust assurance circuit 132 prunes and archives the block content of the first blockchain, up to and including the second block associated with the second SLAT. In some implementations, pruning is accomplished by creating a digital entity collection in an archival data store, such as an archival blockchain (not shown). An electronic value representing a timestamp is extracted from the second block. The timestamp may represent the instant when the block was written and finalized. The trust assurance circuit 132 extracts all blocks of the first blockchain that have a timestamp preceding the timestamp of the second block. The trust assurance circuit 132 writes these extracted blocks to the archival blockchain and resets each of the blocks on the first blockchain such that each archived block's content is cleared. In some embodiments, instead of or in addition to resetting the pruned block(s), when pruning occurs, a replacement record of the pruned blocks is added to the first blockchain. In a subset of these embodiments, the replacement record is a SLAT audit anchor. In certain embodiments, the replacement blocks are written to the first blockchain in the format appropriate for the first blockchain. For example, a block header may indicate whether the block(s) is/are a replacement of pruned blocks. Additionally, a pointer may be included to the audit anchor defined by the corresponding SLAT record.

FIG. 5 is a schematic flow diagram of a method 500 of verifying blockchain content defined by multiple SLAT records and audit anchors, according to an example embodiment. Here, the audit anchors are periodic such that only a segment of blocks on the blockchain 114 is audited. For example, a business entity may retain the first auditor to audit the company's records for a certain fiscal year (and create a first SLAT representative of the audit results) and then retain a second auditor to audit the company's records in a subsequent year.

The second auditor may be associated with the second trusted third-party computing system 104. The second auditor may create a second SLAT. The first SLAT may be associated with the first audit anchor as described with reference to FIG. 4, for example. The second SLAT may be associated with the second audit anchor. The user(s) of the blockchain 114 may then archive the blockchain content defined by the first and second audit anchors such that only the blocks whose integrity is confirmed by the second audit, performed by the second auditor, are archived. Referring to the example implementation of SLAT, the type Level, which indicates the scope of the audit or assessment activity, would be set as follows (note the setting of the parameter delta, which is indicative of incremental, or partial, pruning):

Level::=ENUMERATED {full(0), delta(1)}

If, in contrast, the user(s) of the blockchain 114 trusted the results of the second audit to include or confirm the results of the first audit, then the type Level would be set as follows (note the setting of the parameter full, which is indicative of full pruning up to the point defined by the second audit anchor):

Level::=ENUMERATED {full(1), delta(0)}

In the method 500 of FIG. 5, at 502, the request circuit 126 accesses the third block of the first blockchain 114. At 504, the request circuit 126 receives the third block content to generate a third audit result. At 506, the SLAT generation circuit 128 generates a third SLAT. The third SLAT may be generated according to the method 200 shown in FIG. 2. At 508, the cryptographic circuit 130 digitally signs the third SLAT generated at 506. In some embodiments, the third SLAT is cryptographically protected using a trusted timestamp. In some embodiments, the third SLAT is cryptographically protected using encryption. At 510, the SLAT generation circuit 128 stores the third SLAT in the event journal 112.

At 512, the SLAT generation circuit 128 generates a second audit anchor. In some embodiments, the second audit anchor comprises the third SLAT generated at 508 such that the second SLAT, associated with the first audit anchor and the second block content, and the third SLAT, associated with the second audit anchor and the third block content, define the start and end points (in this case, the second block and the third block, respectively) for pruning and archival of the content of blockchain 114. Advantageously, and in contrast to consensus methods such as proof-of-work, this eliminates the need for and computational expense of repeatedly verifying the segment of the blockchain that is defined by the second SLAT and the third SLAT.

At 514, the SLAT generation circuit stores the second audit anchor generated at 512 on the first blockchain 114.

At 516, the trust assurance circuit 132 prunes and archives the block content of the first blockchain positioned between and including the second block and the third block of the blockchain 114. In some implementations, pruning is accomplished by creating a digital entity collection in an archival data store, such as an archival blockchain. An electronic value representing a timestamp is extracted from the second block. The timestamp may represent the instant when the second block was written and finalized. An electronic value representing a timestamp is extracted from the third block. The timestamp may represent the instant when the third block was written and finalized. The trust assurance circuit 132 extracts all blocks of the first blockchain that have timestamps that place them between the second block and the third block. The trust assurance circuit 132 also extracts the second block and the third block. The trust assurance circuit 132 writes these extracted blocks to the archival blockchain and resets each of the blocks on the first blockchain such that each archived block's content is cleared.

Figure 6:
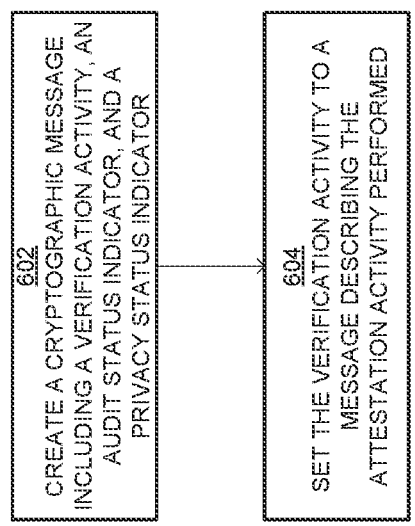
FIG. 6 is a schematic flow diagram of a method of managing a trust verification activity, according to an example embodiment.

FIG. 6 is a schematic flow diagram of a method 600 of managing a verification activity, according to an example embodiment. The verification activity may be associated with an audit message, described in reference to FIG. 7. The verification activity describes the type of audit that was performed on the content of the first blockchain and may include additional information. The verification activity is performed by one or more auditors, for example those associated with the first trusted third-party computing system 102, on the content of the blockchain 114. Different verification activities may be performed by users of the first trusted third-party computing system 102 and the second trusted third-party computing system 104, respectively.

The verification activity may be performed by a user of the verifying party computing system 108 on the content of the blockchain 114 to confirm the integrity of the information stored on the blockchain 114. The verification activity may be stored as part of a SLAT.

At 602, a cryptographic message is created. The cryptographic message is linked to the first SLAT created as described in FIG. 2. In some embodiments, the cryptographic message includes an item where a descriptor of a verification activity is stored.

In some embodiments, a SLAT is configured to be extendable by adding new attributes to the SignedData message. Any user can add any attributes for any purpose to extend the SLAT schema. These attributes can be in any format and have any type needed by the user and can be conceptualized as follows:

OtherAspects ::= SEQUENCE (1..MAX) of OtherAspect
    OtherAspect ::= SEQUENCE {
    type SLAT.&id({OtherSet}),
    value SLAT.&Type({OtherSet}{@type})
    }

```
SLAT ::= TYPE-IDENTIFIER -- See ISO/IEC 8824-2, Annex A
OtherSet SLAT ::= {
--add desired configuration information here
}
```

In some embodiments, the cryptographic message created at 602 includes an audit status indicator and a privacy status indicator. The audit status indicator shows, for example, whether an audit activity has been initiated, how far it has progressed, and/or whether the audit activity has been completed. In some embodiments, the audit status indicator is set by the auditor that performs the verification activity on the content of the first blockchain. In some embodiments, the privacy status indicator is evaluated to prevent exposure of the string content describing the verification activity to the parties that have access to the SLAT in event journal 112. The privacy status indicator may be managed as described in relation to the Result type of SLAT.

At 604, the auditor sets the value of the verification activity item in the cryptographic message.

Figure 7:
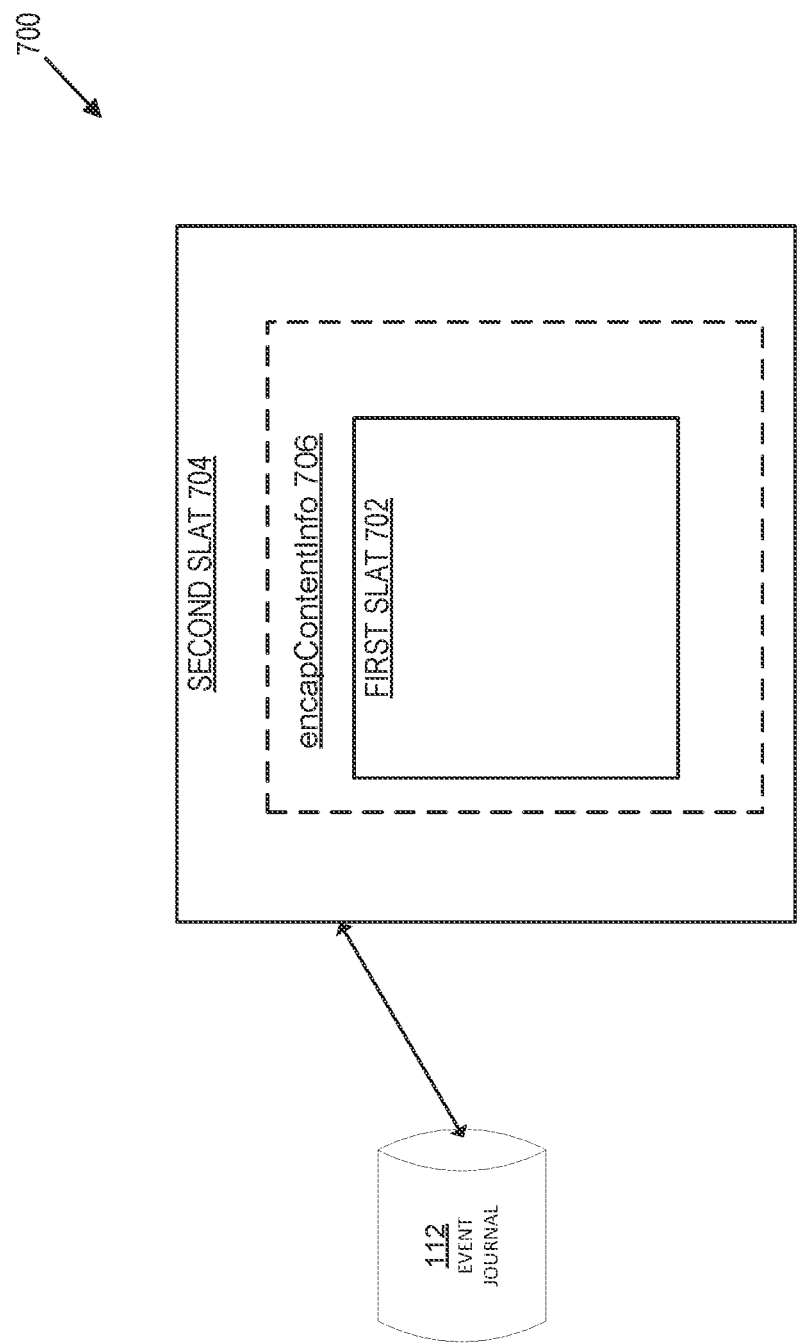
FIG. 7 is a schematic diagram of an encapsulated SLAT, according to an example embodiment.

FIG. 7 is a schematic diagram of an encapsulated SLAT 700, according to an example embodiment. As described above, multiple, different SLATs may be created to capture the current status of the assets in the blockchain 114 at different points in time.

In an example embodiment, a first SLAT 702 may be created for a first audit and written to the event journal 112. Subsequently, a second SLAT 704 may be created for a second audit. In some embodiments, the second SLAT 704 is implemented as a SignedData message where the encap-ContentInfo item 706 includes the content of the first SLAT 702. Thus, the first SLAT 702 is encapsulated (nested) within the second SLAT 704.

FIG. 8 is a schematic flow diagram of a method 800 of trust assurance auditing comprising SLAT, according to an example embodiment. Trust assurance auditing allows verifying parties (e.g., the public or specific designated parties) to access the aspects of the event journal 112 that show whether an audit was performed and/or provide more information about the audit, including any audit activities performed. Verifying parties are defined as the parties that rely on the audit results managed using the SLAT schema. For example, a verifying party may access the functionality to audit the blockchain 114 through a graphical user interface, which, in some embodiments, may be presented to the verifying party via a personal computing device and/or a mobile device, such as a smartphone. As another example, a verifying party may set up an automated query process via an interface engine, which may be configured to access the interface for auditing the blockchain 114 via scheduled automated queries. The scheduled automated queries, in some embodiments, include parameters specifying blocks or block intervals of the blockchain 114. In some embodiments, the audit description pertaining to a block or multiple blocks that were previously audited is captured and the earlier-generated SLAT comprising an audit result is nested within the later-generated SLAT.

At 802, the trust assurance circuit 132 provides an interface for auditing the first blockchain, such as the blockchain 114. The interface may take a variety of forms, including a computer-based interactive user interface or an automated interface engine. For example, the auditor may be presented with a graphical user interface to input audit information, including any audit notes and/or audit results. In some embodiments, this includes setting attributes of the SLAT to particular values.

At 804, the trust assurance circuit 132 receives an audit message. The audit message describes what was done by the auditor as part of the audit. In some embodiments, the audit message includes the relevant attributes, such as the type of audit performed and the block or block ranges that were audited.

In some embodiments, multiple audits are performed over a period of time. In these embodiments, multiple SLAT records are generated. For example, after the first SLAT is generated and then a subsequent audit is performed on the same block, at 806, the SLAT generation circuit 128 writes the audit message received at 804 to the second SLAT. In some embodiments, the second SLAT is a SignedData message that includes at least one item for capturing the content of the audit message.

At 808, the SLAT generation circuit 128 encapsulates the first SLAT within the second SLAT. As a result, the first SLAT SignedData message is nested within the second SLAT SignedData message. In some implementations, the nesting is performed as described in reference to FIG. 7.

FIG. 9 is a schematic flow diagram of a method 900 of anonymizing a trust assurance audit report or message, according to an example embodiment. For a given blockchain, common attributes may be defined that are expected by the parties permitted access to ledger content. For example, in the case of "detached" SignedData, where the content is not present in the SignedData message, a signed attribute may be included in the message to indicate the location of the signed content. This location may provide access controls that restrict access to safeguard the confidentiality of the signed content, as described above in reference to the management of the Result type.

At 902, the cryptographic circuit 130 provides an interface for auditing the first blockchain, such as the blockchain 114. In some embodiments, the interface is a data entry form. In other embodiments, the interface is an engine that facilitates bulk transferring of data.

At 904, the cryptographic circuit 130 receives an audit result. In some embodiments, the audit result contains a character string including a description of an audit activity performed. In some embodiments, the SLAT generation circuit 128 stores the audit result in a storage location that is different from the event journal 112. The storage location may be a blockchain, a relational database, or another type of secured storage. In some embodiments, the audit result is encrypted. In some embodiments, the audit result is tokenized. Whether encrypted or tokenized, in some embodiments the audit result is also digitally signed. In certain embodiments, the audit result is signcrypted. The audit result is written to the first SLAT.

At 906, the audit message is anonymized. For example, in some embodiments, the SLAT generation circuit 128 is configured to identify the audit result in the first SLAT, copy the audit result to a separate storage location, such as the second event journal 150, and replace the audit result in the first SLAT, located in the first event journal 112, with a pointer.

Figure 10A:
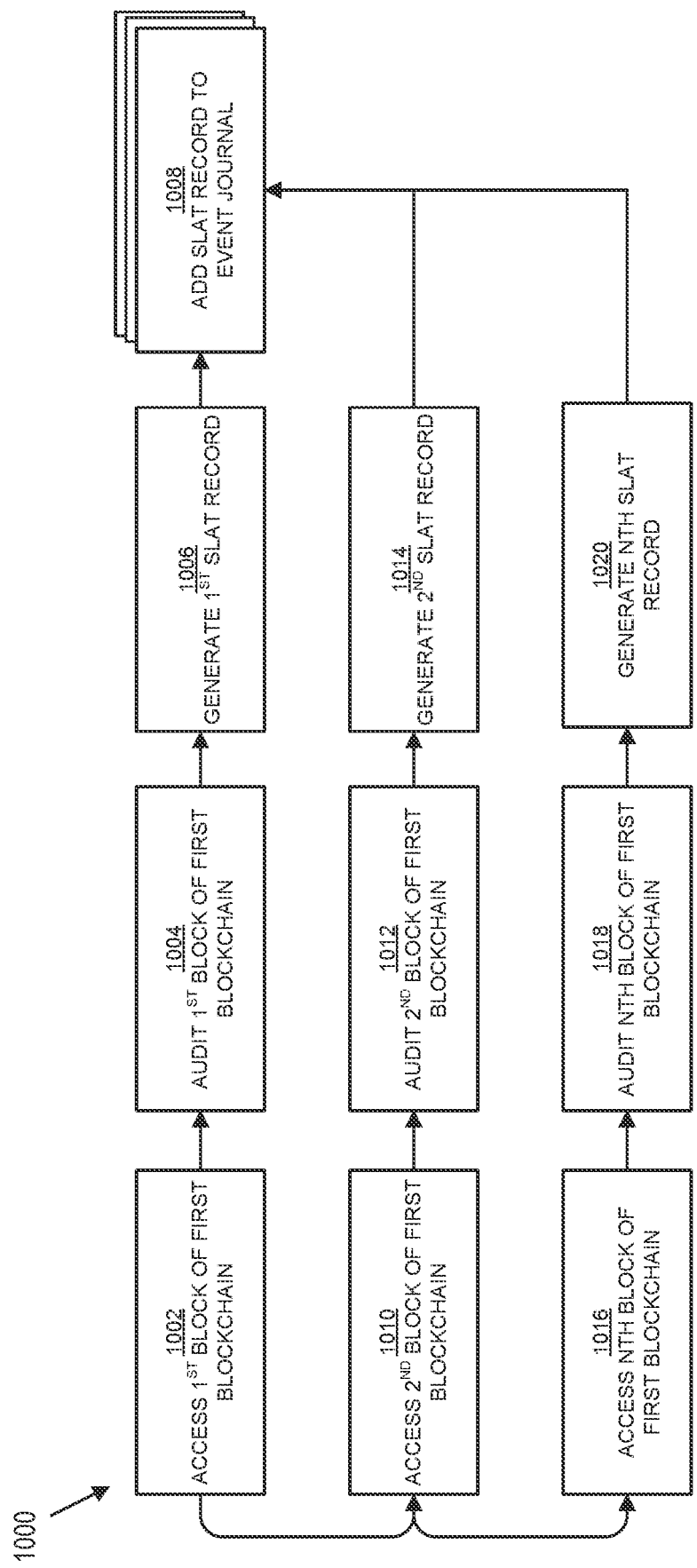
FIG. 10A is a schematic flow diagram of a method of managing an audit using SLAT, the audit having a one-to-one correspondence between the audited blocks and SLAT records.

FIG. 10A is a schematic flow diagram of a method 1000 of managing an audit using SLAT, the audit having a one-to-one correspondence between the audited blocks and SLAT records. At 1002, the request circuit 126 accesses the first block of the first blockchain. At 1004, the SLAT circuit 128 audits the first block. At 1006, the SLAT circuit 128 generates the first SLAT record. At 1008, the resulting SLAT record is added to the event journal. In some embodiments, this process is repeated for additional blocks, as shown in 1010-1014 and 1016-1020.

Figure 10B:
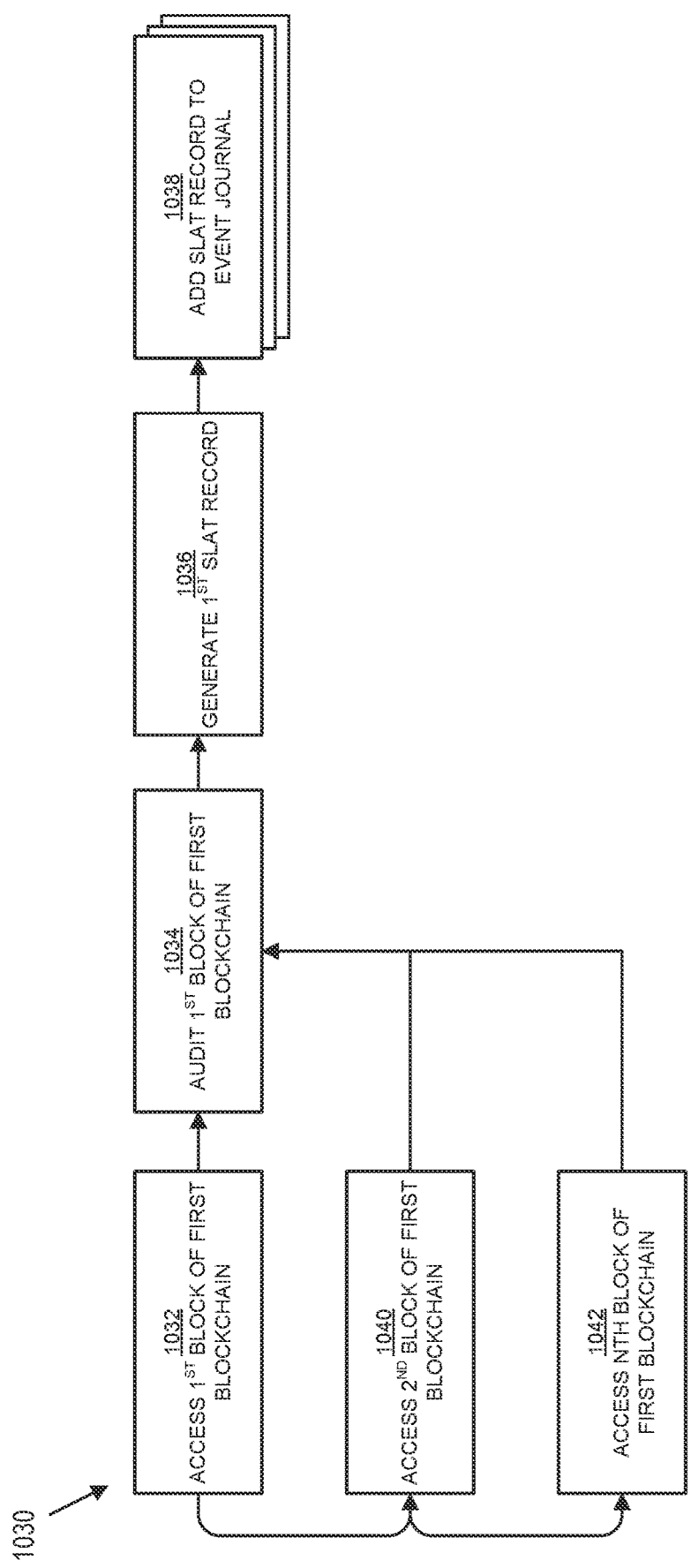
FIG. 10B is a schematic flow diagram of a method of managing an audit using SLAT, the audit having a many-to-one correspondence between the audited blocks and SLAT records.

FIG. 10B is a schematic flow diagram of a method 1030 of managing an audit using SLAT, the audit having a many-to-one correspondence between the audited blocks and SLAT records. Examples of embodiments where such an audit is appropriate include audits of historical data where an event or series of events to be audited is/are represented by a plurality of blocks in a single blockchain. At 1032, the request circuit 126 accesses the first block of the first blockchain. At 1034, the SLAT circuit 128 audits the first block. At 1036, the SLAT circuit 128 generates the first SLAT record. At 1038, the resulting SLAT record is added to the event journal. In some embodiments, multiple additional blocks may be accessed and audited, as shown in 1040-1042, before the resulting first SLAT record is generated and added to the event journal at 1038.

Figure 10C:
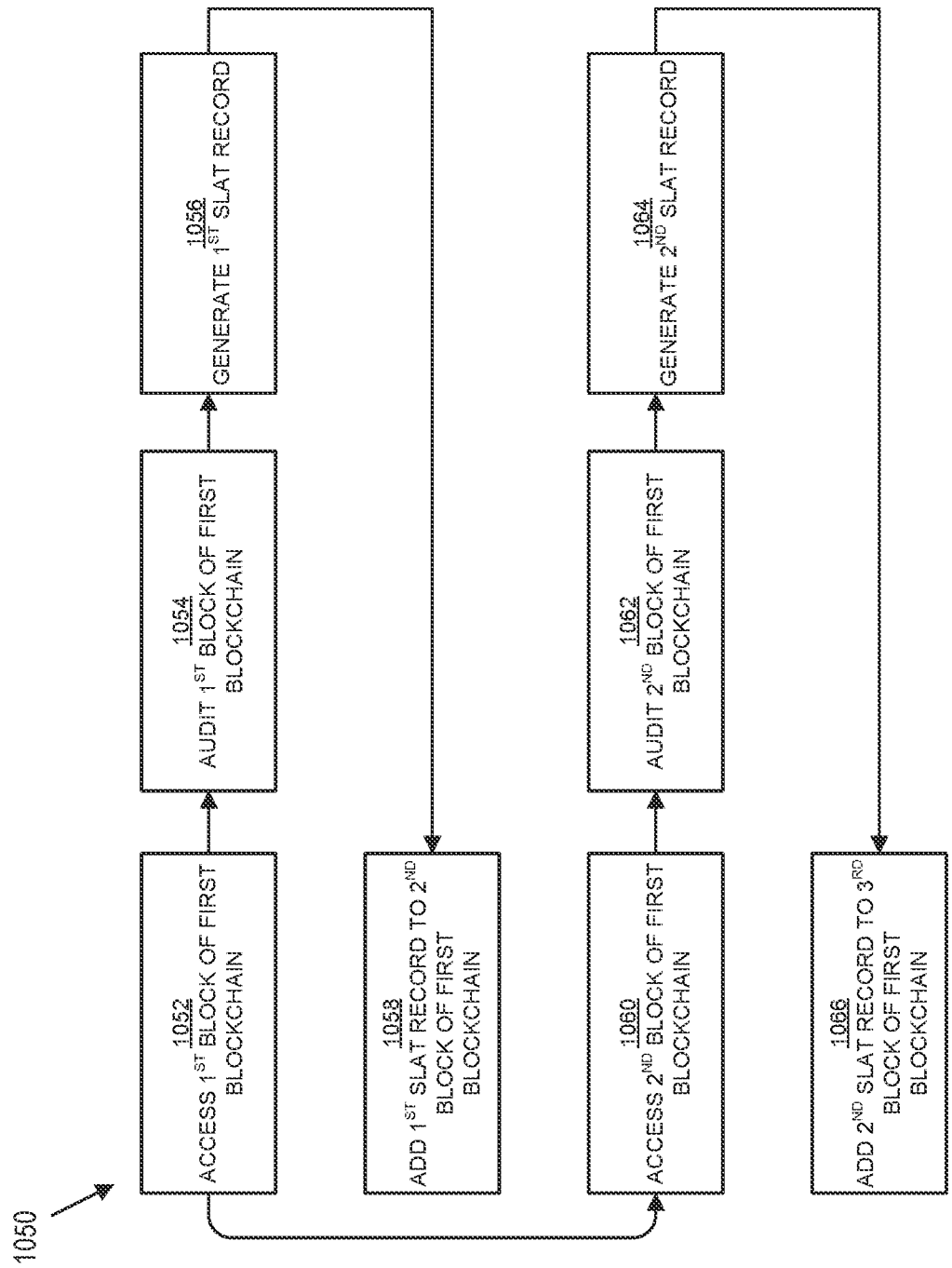
FIG. 10C is a schematic flow diagram of a method of managing an audit using SLAT, where SLAT records represent audits of each block in a blockchain and are embedded in each successive block.

FIG. 10C is a schematic flow diagram of a method 1050 of managing an audit using SLAT, where SLAT records represent audits of each block in a blockchain and are embedded in each successive block. Thus, the SLAT record for block N might be stored in block N+1 or later such that SLAT is behind the blockchain. As shown, at 1052, the request circuit 126 accesses the first block of the first blockchain. At 1054, the SLAT circuit 128 audits the first block. At 1056, the SLAT circuit 128 generates the first SLAT record. At 1058, the resulting first SLAT record is added to the second block of the first blockchain. In some embodiments, this happens before the second block is finalized. In other embodiments, this happens as the second block is finalized.

At 1060, the request circuit 126 accesses the second block of the first blockchain. In some embodiments, the second block of the first blockchain immediately follows the first block of the first blockchain. At 1062, the SLAT circuit 128 audits the second block. At 1064, the SLAT circuit 128 generates the second SLAT record. At 1066, the resulting second SLAT record is added to the second block of the first blockchain. In some embodiments, at 1066, the resulting second SLAT record is added to the third block of the first blockchain such that each successive block in the blockchain is audited and the audit result is stored in a block created later in time.

Figure 11:
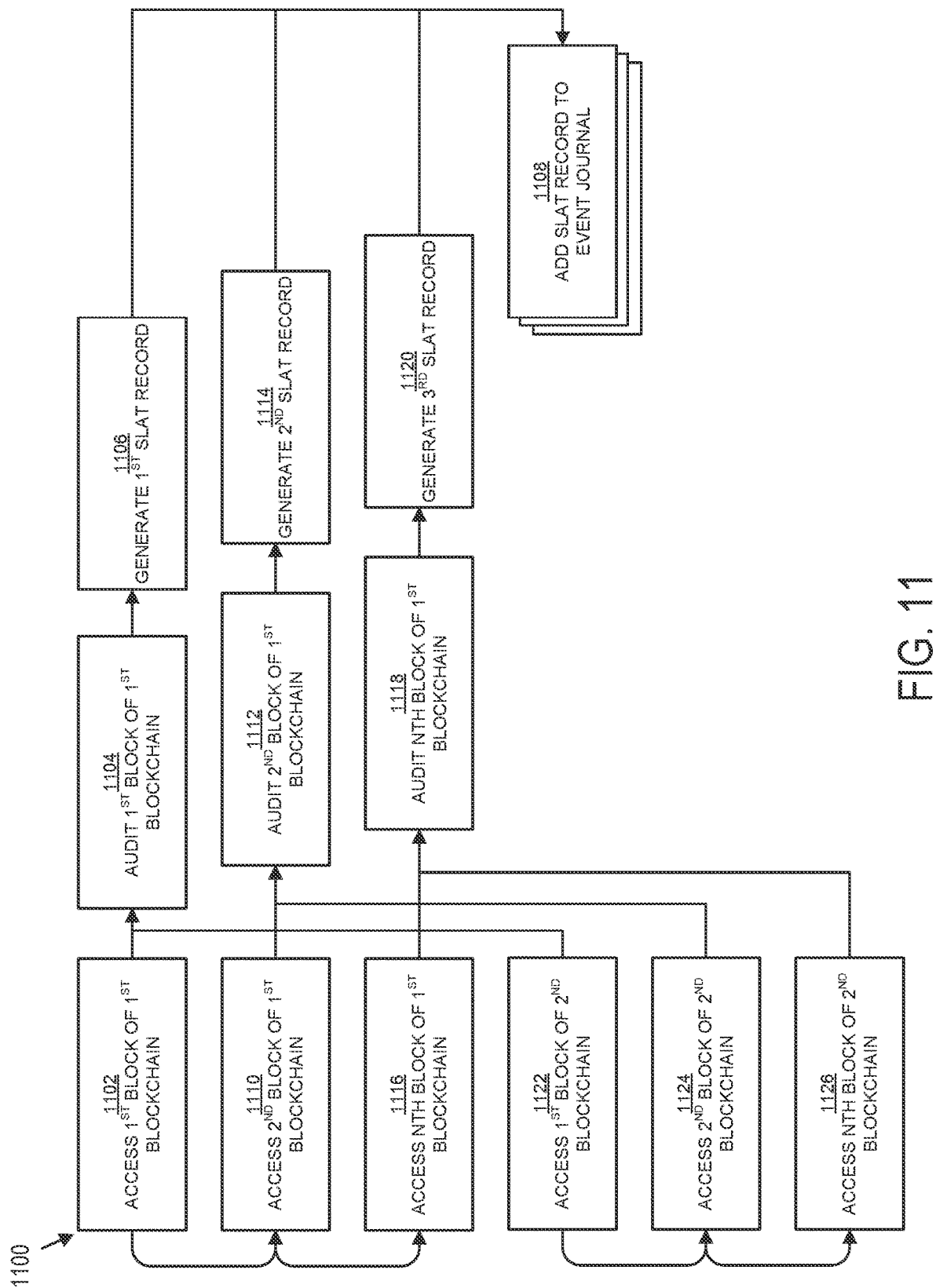
FIG. 11 is a schematic flow diagram of a method of managing a cross-audit using SLAT, such that blocks from two different blockchains are audited in a single SLAT.

FIG. 11 is a schematic flow diagram of a method 1100 of managing a cross-audit using SLAT, such that related blocks from two different blockchains are audited in a single SLAT. Examples of embodiments involving a single blockchain where such an audit is appropriate include business transactions that require two data feeds from two separate entities for completion, such as a foreign exchange transaction, which may be recorded on the first blockchain, requiring currency exchange rates that may be recorded in a point-in-time fashion on the second blockchain.

As shown in FIG. 11, two or more logically related blocks from two separate blockchains are audited such that the audit results are represented in a single SLAT record. For instance, at 1102, the request circuit 126 accesses the first block of the first blockchain, which is audited by the SLAT circuit 128 at 1104. At 1122, the request circuit 126 accesses the cross-reference content of the first block of the second blockchain, which informs the results of the audit performed at 1104. As an example, then-current exchange rates stored on the second blockchain and accessed at 1122 are evaluated at 1104 to assess the legitimacy of the transaction accessed at 1102. At 1106, the first SLAT record is generated by the SLAT circuit 128, which adds the first SLAT record to the event journal at 1108.

Multiple additional block pairs may be audited. For instance, at 1110, the request circuit 126 accesses the second block of the first blockchain, which is audited by the SLAT circuit 128 at 1112. At 1124, the request circuit 126 accesses the second block of the second blockchain, which informs the results of the audit performed at 1112. At 1114, the second SLAT record is generated by the SLAT circuit 128, which adds the second SLAT record to the event journal at 1108. At 1116, the request circuit 126 accesses the Nth block of the first blockchain, which is audited by the SLAT circuit 128 at 1118. At 1126, the request circuit 126 accesses the Nth block of the second blockchain, which informs the results of the audit performed at 1118. At 1120, the third SLAT record is generated by the SLAT circuit 128, which adds the third SLAT record to the event journal at 1108.

Figure 12:
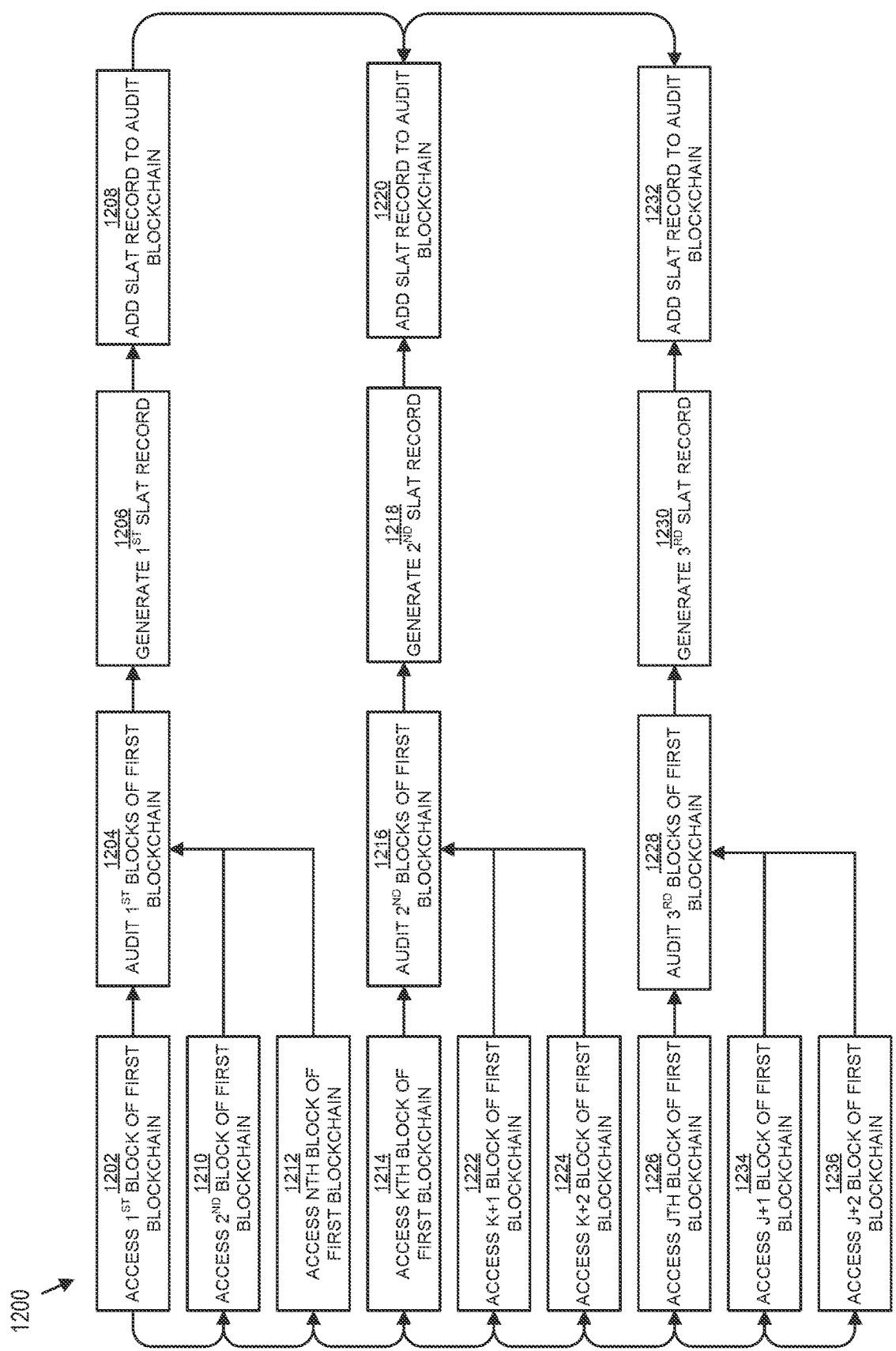
FIG. 12 is a schematic flow diagram of an example method of implementing the SLAT schema as a blockchain.

FIG. 12 is a schematic flow diagram of an example method 1200 of implementing the SLAT schema as a blockchain. In some embodiments, each SLAT record represents an audit point of one or more blocks within a given blockchain, and the event journal is itself another blockchain. In a subset of these embodiments, the event journal is embedded into the audited blockchain. In some embodiments, the audit blockchain replaces the event journal 112.

As shown, subsets of blocks are audited in groups, each group audit resulting in a single SLAT record. These subsets of blocks audited together may be logically related. For example, at 1202, the request circuit accesses the first block of the first blockchain. At 1210, the request circuit 126 accesses the second block of the first blockchain. At 1212, the request circuit 126 accesses the Nth block of the first blockchain. At 1204, the aforementioned blocks are audited, and at 1206, a first SLAT record is generated by the SLAT circuit 128. At 1208, the SLAT circuit 128 adds the first SLAT record to an audit blockchain. Thus, the first, second and Nth block define a logical grouping. In certain embodiments, this process is repeated for blocks K, K+1, and K+2, as shown at 1214-1224 such that exactly two groups of blocks are audited. In some embodiments, this process is further repeated for blocks J, J+1, and J+2, as shown at 1226-1236 such that more than two groups of blocks are audited.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps; the sequence of certain processes may be reversed or otherwise varied; and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:
1. A method comprising:
  auditing, by a computing system, a block content of a blockchain to generate an audit result, wherein the auditing comprises evaluating, by the computing system, a cross-reference content such that the audit result is informed by at least the cross-reference content;

generating, by the computing system, a first secure ledger assurance token (SLAT), the first SLAT comprising a signed pointer linking to a separate data structure that contains the audit result; and encapsulating, by the computing system, the first SLAT within a second SLAT.

2. The method of claim 1, wherein the signed pointer is encrypted.

3. The method of claim 2, wherein the ciphertext value comprises a Cryptographic Message Syntax (CMS) message.

4. The method of claim 1, wherein the block content of the blockchain corresponds to the cross-reference content, the cross-reference content is stored in another blockchain.

5. The method of claim 1, the audit result is related to at least one of a public key infrastructure assessment relative to the cross-reference content and a security assessment relative to the cross-reference content.

6. The method of claim 1, wherein the audit result is related to an assessment of a timestamp associated with the block content.

7. The method of claim 1, wherein the audit result comprises a tokenized value.

8. A system, comprising:
at least one processing circuit comprising at least one processor and at least one memory, the processing circuit configured to:
audit a block content of a blockchain to generate an audit result, wherein the auditing comprises evaluating, by the computing system, a cross-reference content such that the audit result is informed by at least the cross-reference content;
generate a first secure ledger assurance token (SLAT), the first SLAT comprising a signed pointer linking to a separate data structure that contains the audit result; and
encapsulate the first SLAT within a second SLAT.

9. The system of claim 8, wherein the separate data structure comprises a plaintext value and a ciphertext value.

10. The system of claim 9, wherein the ciphertext value comprises a Cryptographic Message Syntax (CMS) message.

11. The system of claim 8, wherein the block content of the blockchain corresponds to the cross-reference content, the cross-reference content is stored in another blockchain.

12. The system of claim 8, the audit result is related to at least one of a public key infrastructure assessment relative to the cross-reference content and a security assessment relative to the cross-reference content.

13. The system of claim 8, wherein the audit result is related to an assessment of a timestamp associated with the block content.

14. The system of claim 8, wherein the audit result comprises a tokenized value.

15. At least one non-transitory computer-readable medium comprising computer-readable instructions such that, when executed by at least one processor, causes the at least one processor to:

audit a block content of a blockchain to generate an audit result, wherein the auditing comprises evaluating, by the computing system, a cross-reference content such that the audit result is informed by at least the cross-reference content;

generate a first secure ledger assurance token (SLAT), the first SLAT comprising a signed pointer linking to a separate data structure that contains the audit result; and encapsulate the first SLAT within a second SLAT.

16. The non-transitory computer-readable medium of claim 15, wherein the separate data structure comprises a plaintext value and a ciphertext value.

17. The non-transitory computer-readable medium of claim 16, wherein the ciphertext value comprises a Cryptographic Message Syntax (CMS) message.

18. The non-transitory computer-readable medium of claim 15, wherein the block content of the blockchain corresponds to the cross-reference content, the cross-reference content is stored in another blockchain.

19. The non-transitory computer-readable medium of claim 15, the audit result is related to at least one of a public key infrastructure assessment relative to the cross-reference content and a security assessment relative to the cross-reference content.

20. The non-transitory computer-readable medium of claim 15, wherein the audit result is related to an assessment of a timestamp associated with the block content.

* * * * *